Oct. 21, 1947.  J. E. MacDONALD  2,429,520
MULTIPLE BRICK FURNACE ROOF STRUCTURE INCLUDING INDIVIDUAL FACING BLOCKS
Filed July 15, 1944  2 Sheets-Sheet 1
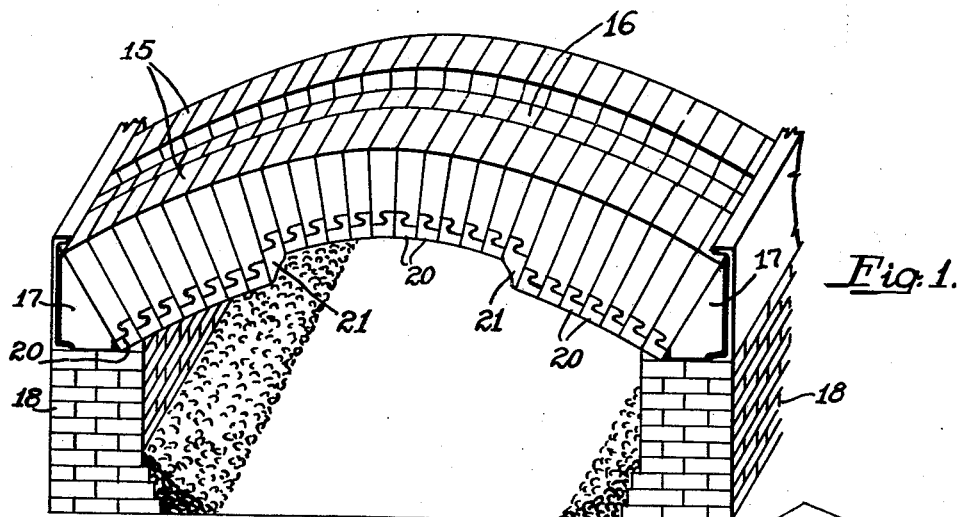
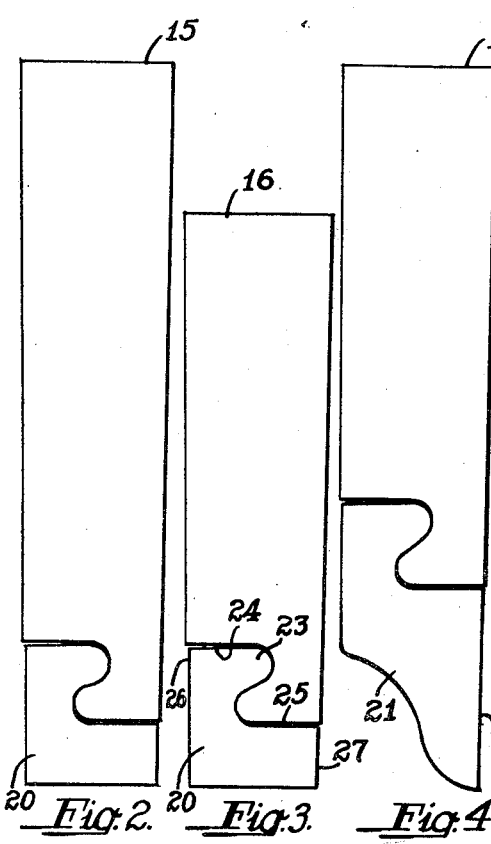
INVENTOR.
James E. MacDonald
BY Archworth Martin
His ATTORNEY.

Oct. 21, 1947.    J. E. MacDONALD    2,429,520
MULTIPLE BRICK FURNACE ROOF STRUCTURE INCLUDING INDIVIDUAL FACING BLOCKS
Filed July 15, 1944    2 Sheets-Sheet 2
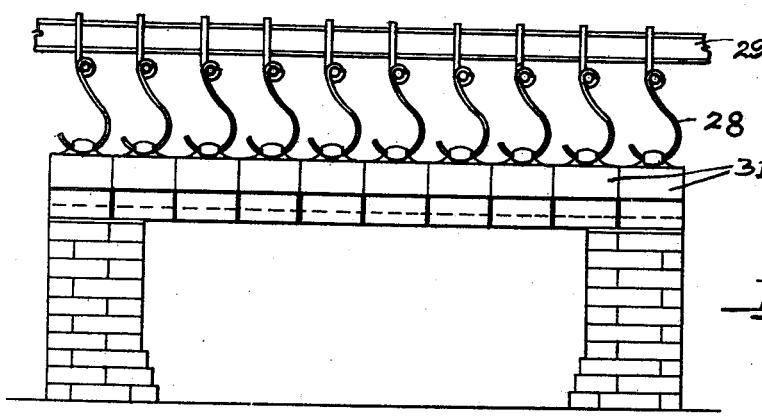
Fig. 9.
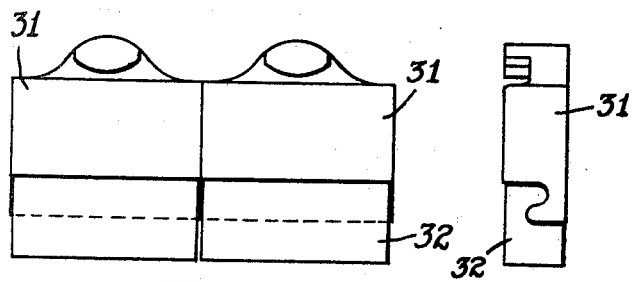
Fig. 10.   Fig. 11.
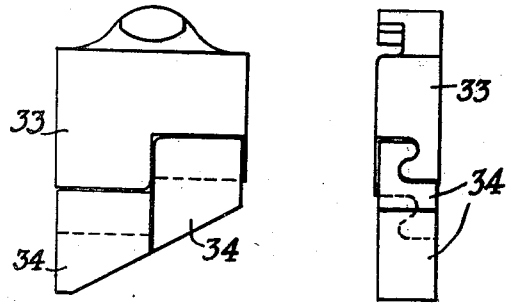   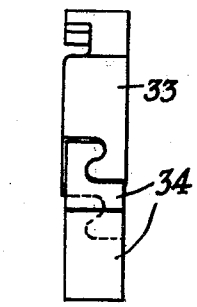   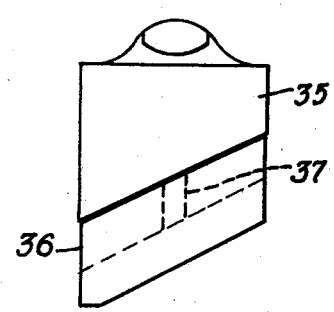
Fig. 12.   Fig. 13.   Fig. 14.
INVENTOR.
James E. MacDonald
BY Archworth Martin
His ATTORNEY.

Patented Oct. 21, 1947

2,429,520

UNITED STATES PATENT OFFICE 2,429,520

MULTIPLE BRICK FURNACE ROOF STRUCTURE INCLUDING INDIVIDUAL FACING BLOCKS

James E. MacDonald, Latrobe, Pa., assignor to McFeely Brick Company, Latrobe, Pa., a corporation of Pennsylvania Application July 15, 1944, Serial No. 545,130

2 Claims. (Cl. 110—99)

My invention relates to furnace wall structures and is herein shown and described as embodied in the roofs or top wall of open hearth furnaces.

One object of my invention is to provide a top wall or the like wherein silica bricks, which are much cheaper and have greater mechanical strength than basic bricks such as those of magnesite, can be employed, because their ends which would otherwise be directly exposed to the heating gases and molten slag are protected by auxiliary bricks or facing blocks that are more highly refractory and shield the silica bricks from direct contact with the furnace gases and slag.

Another object of my invention is to provide a structure of the character referred to wherein the facing blocks or tips will protect the silica bricks against rapid spalling and wearing away, and permit the development of tridymite and cristobalite in the silica bricks, so they will be highly resistant to spalling and slag action when they eventually become exposed during use of the furnace.

A further object of my invention is to provide a structure wherein the facing blocks or tips for the silica bricks are so formed and interlocked with the silica bricks as to protect the silica bricks from contact with the heating gases or molten slag and which will not cause ruptures or breakage in the roof.

The super refractory facing blocks have a lesser coefficient of expansion than the silica bricks, and at no time during service will they become compressed and sheared off, since the expansion thrusts in the roof will be in the silica brick portion of the structure.

Drop roofs in open hearth furnaces (referred to in the art as "shoulders") are in general composed of silica bricks extending 4½" to 6" into the furnace along the backwall and frontwall.

Excessive wearing away at this point causes early roof failure, therefore the "drop" is used. However, the erosion of the silica dripping onto the basic backwall that is usually composed of magnesite bricks creates a chemical reaction and backwall "cutting-out." Basic "shoulders" are used to some extent for the purpose of eliminating the "cutting-out" of the backwall. Complete basic bricks are used and in addition to being very costly, some objectionable mechanical conditions are encountered. For example, magnesite bricks are physically weak and tend to spall. Magnesite and silica react chemically at certain high temperatures and where the magnesite "drop" roof is joined to the regular silica roof such chemical action can be expected.

In open hearth furnaces of the tilting type, the slag will at times come into contact with the roof, at the backwall. In all furnaces, and particularly those into which light scrap is charged, the flames are deflected against the roof or the roof shoulders, at the frontwall and backwall, causing rapid erosion of the roof so that often, while the bricks at the top or middle sections are nearly of the original length, those near the shoulders are so burned away or eroded as to require an entirely new roof.

As shown on the accompanying drawings, Figure 1 is a perspective view of a portion of an open hearth furnace embodying my invention, showing a ribbed form of arch wherein alternate courses of bricks are of different lengths; Figs. 2 to 5 are enlarged views of certain of the long and the short bricks employed in the ribbed arch and indicating the clearance that is employed at the joints or points of connection between the various arch bricks and their facing blocks or tips; Figs. 6, 7 and 8 are respectively perspective views of one of the main arch bricks and the two different forms of tips that are employed; Fig. 9 is an elevational view showing a furnace of the suspended roof type with my invention embodied therein; Fig. 10 is an enlarged face view of a portion of the roof of Fig. 9; Fig. 11 is an end view of the roof bricks; Fig. 12 is a face view showing a modification of the bricks of Fig. 10, these bricks, however, being especially suitable for forming a slope roof or neck; Fig. 13 is an end view thereof, and Fig. 14 shows still another modification.

Referring first to Figures 1 to 8, I show a roof structure of the ribbed type wherein each course or row of bricks is of different length than the adjacent courses. The arch sections of greatest length are indicated by the numeral 15 and the shorter arch bricks by the numeral 16. They are both supported by the skewbacks 17 in the usual manner, that are in turn mounted upon the vertical walls 18. The facing tips are designated by the numerals 20 and 21. These tips are of more highly refractory material than are the silica bricks 15 and 16 and may suitably be of cyanite, sillimanite, chrome, or other super refractory material.

Throughout the major portion of each arch course, the tips 20 of the form and sizes shown in Figs. 2, 3, and 8 are employed, while at the shoulders of each course, the tip blocks 21 are employed. The form of connection between all of the tips and their associated silica are the same however in each case. Where a shoulder arch is employed as shown in Fig. 1, the bricks near the end of each arch course are of greater length than those near the middle of the arch, this being true of both the courses 15 and 16. The furnace roof is of smooth contour on its under side except for the shoulder portions 21 (Fig. 1).

It is of great importance that no such thrust be exerted on the tip bricks as would cause shearing off of the silica bricks, and although the facing blocks 20 and 21 will usually have a lesser coefficient of expansion than the silica bricks, additional clearance is provided between the upper sides 24 of the ribs 23 on these facing blocks and the adjacent surfaces of the silica bricks, the surfaces 24 being sloped somewhat, to give greater clearance for tilting. Likewise, there is clearance provided at 25, 26, and 27, between the opposed surfaces of the silica bricks and the facing blocks. In the case of the smaller sizes of bricks, this need be but little more than $\frac{1}{32}$ of an inch.

Theoretically, a ceramist can calculate the exact coefficient of expansion of the materials to be used in combination, such as silica and chrome, silica and cyanite, etc., so that when subjected to operating temperatures the joints between the facing tips would be nearly closed. But complete closure of the joints could not readily be accomplished, since silica expands more greatly than do the super refractories contemplated, because of irregularities resulting from commercial brick tolerances, various brick densities, and various rates of expansion of different materials. I therefore provide the loosely-supported facing blocks, which are freely tiltable relative to the silica bricks, on their ribs 23, when installed, and during expansive and contractive movements of the silica bricks, so that throughout most of their facing areas, the silica bricks will be protected.

As the facing blocks are in effect pivotally suspended on their ribs 23, they will tilt against the sides of adjacent silica bricks and thus form a seal that will prevent the gases entering between the silica bricks. Also the facing blocks will have engagement with one another through this tilting, to still more effectively prevent the entry of hot gases between the silica bricks.

Referring now to Fig. 9, I show a roof of the suspended type, which is supported in any well known manner by the usual metal hangers 28 and beams 29. In this case, the roof bricks 31 and the facing blocks or tips 32 have interlocking engagement in substantially the same manner as in the case of Fig. 1, the blocks 37 being made of more highly refractory material than the bricks 31 and having the same clearance, tilting action, and sealing effect as explained above in describing Fig. 1.

Where a neck roof construction is desired, the main roof brick 33 will be of stepped form shown in Figs. 12 and 13, while the facing blocks 34 will have their under sides sloped as shown more clearly in Fig. 12.

In Fig. 14, still another form of slope or neck brick structure is employed. In this case, the silica bricks 35 are sloped instead of stepped, and the facing block 36 is similarly sloped, and is provided with a short vertical rib 37 fitting a groove in the brick 35 to prevent it slipping on the inclined surfaces.

While I have herein referred to the roofs as being of silica brick, it will be understood that other kinds of bricks of sufficient strength may be employed and protected by the highly refractory facing blocks or tips.

The silica bricks referred to herein may be of various well known compositions, as commonly known in the industry, while the cyanite and other more highly refractory facing blocks will be of any of well known compositions employed in the furnace art, such as those used in the making of glass-melting tanks.

I claim as my invention:

1. A furnace roof comprising bricks laid in courses and each having a groove exposed toward one vertical face of the bricks, adjacent to the lower extremity of the bricks, a single facing block for each brick, having an upwardly extending portion lying opposite to the groove of its associated brick and provided with a rib loosely fitting in the groove, the blocks each being of narrower width than the widths of the various bricks in directions generally parallel to the said courses, and each being loosely supported by its rib, in a tilted position relative to the longitudinal axis of its associated brick, with the upper corner of its extended portion in engagement with the vertical face of an adjacent brick.

2. A furnace roof comprising bricks laid in courses and each having a groove exposed toward one vertical face of the bricks, adjacent to the lower extremity of the bricks, a single facing block for each brick, having an upwardly extending portion lying opposite to the groove of its associated brick and provided with a rib loosely fitting in the groove, the blocks each being of narrower width than the widths of the various bricks in directions generally parallel to the said courses, and each being loosely supported by its rib, in a tilted position relative to the longitudinal axis of its associated brick, with the upper corner of its extended portion in engagement with the vertical face of an adjacent brick, and with its opposite lower corner in engagement with an adjacent block.

JAMES E. MacDONALD.

REFERENCES CITED

The following references are of record in the file of this patent:

UNITED STATES PATENTS

| Number | Name | Date |
|---|---|---|
| 1,410,729 | Balz | Mar. 28, 1922 |
| 1,648,363 | Reintjes | Nov. 8, 1927 |
| 1,666,284 | Gilchrist | Apr. 17, 1928 |
| 1,683,963 | Duquenne | Sept. 11, 1928 |
| 1,698,395 | De Grand | Jan. 8, 1929 |
| 1,705,965 | De Wolf | Mar. 19, 1929 |
| 2,068,863 | Mannshardt | Jan. 26, 1937 |
| 2,119,779 | Crysler | June 7, 1938 |
| 2,299,102 | McLimans | Oct. 20, 1942 |